US010442041B2

(12) United States Patent
Whitfield, Sr. et al.

(10) Patent No.: US 10,442,041 B2
(45) Date of Patent: Oct. 15, 2019

(54) NAIL PLATER APPARATUS AND RELATED METHODS

(71) Applicant: CHEP Technology Pty Limited, Sydney (AU)

(72) Inventors: Dwight Bryan Whitfield, Sr., Whigham, GA (US); Frank S. Lusczakoski, Orlando, FL (US)

(73) Assignee: CHEP Technology Pty Limited, Sydney (AU)

( * ) Notice: Subject to any disclaimer, the term of this patent is extended or adjusted under 35 U.S.C. 154(b) by 348 days.

(21) Appl. No.: 15/357,061

(22) Filed: Nov. 21, 2016

(65) Prior Publication Data
US 2018/0141171 A1 May 24, 2018

(51) Int. Cl.
*B23P 19/04* (2006.01)
*F16B 15/00* (2006.01)
(Continued)

(52) U.S. Cl.
CPC .............. *B23P 19/04* (2013.01); *B23P 19/004* (2013.01); *B27F 7/00* (2013.01); *B27F 7/003* (2013.01);
(Continued)

(58) Field of Classification Search
CPC ......... B23P 19/04; B23P 19/004; B27M 3/00; B27F 7/00; B65D 19/0069; B65D 19/38; B65D 2519/00064; B65D 2519/00273; B65D 2519/00293; B65D 2519/00323; B65D 2519/00572; B65D 2519/00029; F16B 15/0046
See application file for complete search history.

(56) References Cited

U.S. PATENT DOCUMENTS

| 3,939,348 A * | 2/1976 | Barrett | G01J 3/26 250/339.13 |
| 3,945,549 A * | 3/1976 | Colson | B27F 7/02 227/45 |

(Continued)

FOREIGN PATENT DOCUMENTS

AU    20140268192    12/2014

OTHER PUBLICATIONS

Lin et al. "Design of an automated wood-pallet machine" Journal of Applied Science and Engineering Technology: 2007; pp. 33-39.

*Primary Examiner* — John C Hong
(74) *Attorney, Agent, or Firm* — Allen, Dyer, Doppelt + Gilchrist, PA

(57) ABSTRACT

A nail plater apparatus includes a board magazine configured to hold stacked boards, and a pair of spaced apart nail plate magazines, with each nail plate magazine configured to hold stacked nail plates. The nail plater apparatus includes a pair of spaced apart nail plate extractor assemblies, with each nail plate extractor assembly associated with a respective nail plate magazine and configured to position a nail plate therefrom to a respective nail plate pressing area. A board feeder is configured to position a board from the board magazine to a board receiving area, with ends of the board being aligned with the nail plates positioned in the respective nail plate pressing areas. A pair of spaced apart nail plate presser assemblies overlie ends of the board receiving area and is aligned with the respective nail plate pressing areas to press the nail plates into the ends of the board.

24 Claims, 12 Drawing Sheets

(51) Int. Cl.
   *B23P 19/00*  (2006.01)
   *B65D 19/00*  (2006.01)
   *B65D 19/38*  (2006.01)
   *B27F 7/00*   (2006.01)
   *B27F 7/15*   (2006.01)
   *B27M 3/00*   (2006.01)

(52) U.S. Cl.
   CPC ........... *B27F 7/155* (2013.01); *B27M 3/0073* (2013.01); *B65D 19/0069* (2013.01); *B65D 19/38* (2013.01); *B65D 2519/00029* (2013.01); *B65D 2519/00064* (2013.01); *B65D 2519/00273* (2013.01); *B65D 2519/00293* (2013.01); *B65D 2519/00323* (2013.01); *B65D 2519/00572* (2013.01); *F16B 15/0046* (2013.01)

(56) References Cited

U.S. PATENT DOCUMENTS

| | | | |
|---|---|---|---|
| 4,047,282 A | | 9/1977 | Jureit et al. |
| 4,403,388 A | | 9/1983 | Belcher |
| 4,743,054 A | * | 5/1988 | Lavalerie .................. B25B 5/06 |
| | | | 292/256.67 |
| 5,379,513 A | * | 1/1995 | Thompson .............. B27F 7/006 |
| | | | 227/45 |
| 7,165,304 B2 | * | 1/2007 | Smith .................. B27M 3/0073 |
| | | | 29/281.5 |
| 7,896,211 B2 | * | 3/2011 | Tu ........................ B27M 3/0073 |
| | | | 198/604 |

* cited by examiner

NAIL PLATER APPARATUS AND RELATED METHODS

FIELD OF THE INVENTION

The present invention relates to the field of nail plates, and more particularly, to an apparatus used to press nail plates onto ends of pallet boards, and to related methods for operating the same.

BACKGROUND OF THE INVENTION

Conventional wood pallets include a base layer and a cargo layer separated therefrom by support blocks. Traditionally, the base and cargo layers respectively have end deck boards assembled on connector boards that run the full length or width of the pallet. The end deck boards are nailed through the connector boards into the support blocks to build the primary structure of the pallet. The end deck boards are also known as lead boards, and the connector boards are also known as stringer boards.

To move the wooden pallets with cargo thereon, forklift tines are inserted into the gaps between the base and cargo layers. If the forklift is not stopped in time, the forklift crashes into one of the end deck boards of the pallet. Impacts such as this weaken the pallet and greatly shorten the lifespan of the pallet, thereby causing the pallet to be repaired more frequently and/or removed from service before its anticipated life cycle has been reached.

In an effort to improve pallet durability, nail plates have been used to strengthen wood pallet joints. U.S. Pat. No. 7,516,705 to Hedstrom, for example, discloses nail plates between the connector boards and the support blocks. The nail plates are embedded into the ends of the connector boards. Since only about 2 inches of the ends of the connector boards are nailed to the support blocks, the nail plates greatly strengthen these boards and improve the impact resistance when hit by a forklift or any other object. The '705 patent is assigned to the current assignee of the present invention, and is incorporated by reference in its entirety.

Automated nailing machines are typically used in the production of wood pallets. However, nail plates add an extra production step in this process. When wood pallets are produced in high volumes, this extra production step may slow down manufacture of the wood pallets. Consequently, there is need for a nail platter apparatus to support the production of wood pallets.

SUMMARY OF THE INVENTION

A nail plater apparatus includes a board magazine configured to hold a plurality of stacked boards, and a pair of spaced apart nail plate magazines, with each nail plate magazine configured to hold a plurality of stacked nail plates. The nail plater apparatus may further include a pair of spaced apart nail plate extractor assemblies, with each nail plate extractor assembly associated with a respective nail plate magazine and configured to position a nail plate therefrom to a respective nail plate pressing area.

A board feeder may be configured to position a board from the board magazine to a board receiving area, with ends of the board being aligned with the nail plates positioned in the respective nail plate pressing areas. A pair of spaced apart nail plate presser assemblies may overlie ends of the board receiving area and be aligned with the respective nail plate pressing areas to press the nail plates into the ends of the board.

The board feeder and the pair of spaced apart nail plate extractor assemblies may be linked together so that the board is positioned in the board receiving area simultaneously when the nail plates are positioned in the respective nail plate pressing areas. This linkage advantageously allows boards to be accurately plated at high speeds.

The board feeder may comprise a pair of spaced apart first and second board extractors, and the pair of spaced apart nail plate extractor assemblies may comprise a pair of spaced apart first and second nail plate extractors.

The nail plate apparatus may further comprise a pair of spaced apart first and second cams each configured to rotate between an in-position and an out-position, with the first board extractor coupled to the first cam and the second board extractor coupled to the second cam. A first linkage may be coupled between the first cam and the second nail plate extractor, and a second linkage may be coupled between the second cam and the first nail plate extractor.

When the first and second cams are rotated to the out-position a board is dropped from the board magazine to a board staging area adjacent the pair of spaced apart first and second board extractors, and nail plates are dropped from the pair of nail plate magazines to nail plate staging areas adjacent the pair of spaced apart first and second nail plate extractors.

When the first and second cams are rotated to the in-position the board is positioned from the board staging area to the board receiving area by the pair of spaced apart first and second board extractors, and the nail plates are positioned from the nail plate staging areas to the nail plate receiving areas by the pair of spaced apart first and second nail plate extractors.

The board in the board staging area may be used by the first and second board extractors to push a board out of the board receiving area after the nail plates have been pressed into the ends thereof by the nail plate presser assemblies.

Each nail plate presser assembly may comprise a hydraulic ram, a press foot coupled to the hydraulic ram, and a pair of spaced apart nail plate retainer jaws pivotly coupled to the press foot and configured to hold the nail plate when positioned in the nail plate receiving area. The pair of nail plate retainer jaws may pivotly move to release the nail plate when the hydraulic ram causes the nail plate to be pressed into the end of the board.

The nail plate apparatus may further comprise an accumulator apron to receive the boards after the nail plates have been pressed into the ends thereof by the nail plate presser assemblies, and a pair of spaced apart accumulator push arms adjacent the accumulator apron and configured to push the boards after a predetermined number of boards have been stacked on the accumulator apron.

Yet another aspect is directed to a method for pressing nail plates into ends of a board using a nail plate apparatus as described above. The method comprises stacking a plurality of boards in a board magazine, and stacking a plurality of nail plates in a pair of spaced apart nail plate magazines. A pair of spaced apart nail plate extractors may be operated, with each nail plate extractor associated with a respective nail plate magazine, to position a nail plate therefrom to a respective nail plate pressing area. A board feeder may be operated to position a board from the board magazine to a board receiving area, with ends of the board being aligned with the nail plates positioned in the respective nail plate pressing areas. A pair of spaced apart nail plate presser assemblies overlying ends of the board receiving area and aligned with the respective nail plate pressing areas may be operated to press the nail plates into the ends of the board.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
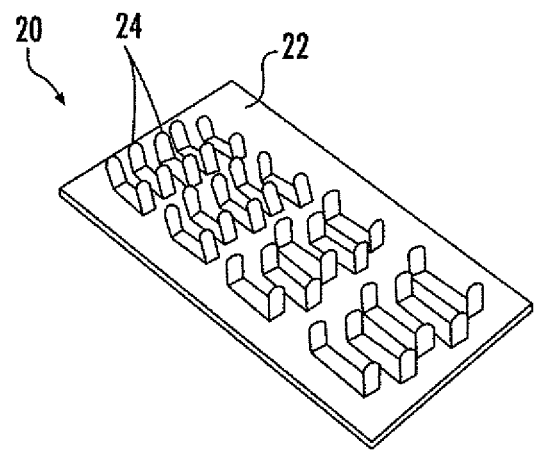
FIG. 1 is a perspective view of a nail plate in accordance with the prior art.

Referring initially to FIG. 1, nail plates 20 may be used to increase the resiliency of wooden pallets. Each nail plate 20 is typically formed from a metal sheet 22, wherein flanges are punched in the metal sheet so that they form projections 24. The projections 24 extend outwards at right angles from the metal sheet 22. The projections 24 are on one side of the metal sheet 22. The other side of the metal sheet 22 is flat and is void of any projections 24. This allows the nail plates 20 to be applied to their respective boards prior to assembly of the wooden pallet.

Figure 2:
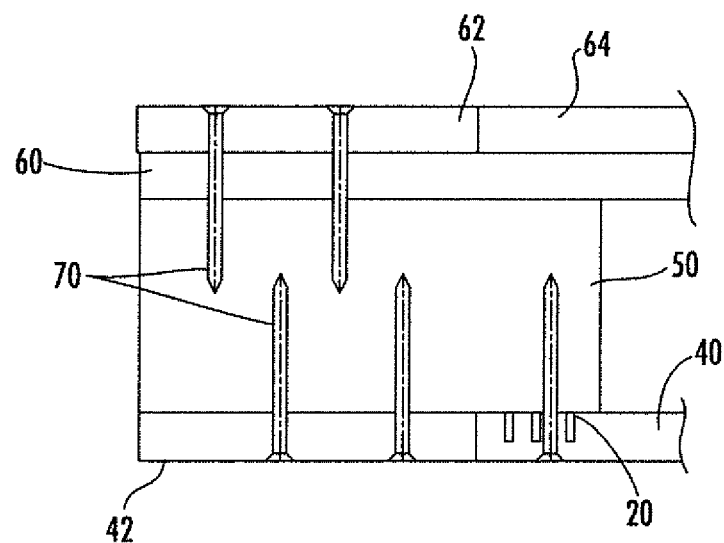
FIG. 2 is a partial cross-sectional view of a wooden pallet with a nail plate as shown in FIG. 1.

A partial cross-sectional view of an assembled wooden pallet 30 in FIG. 2 illustrates a nail plate 20 between a bottom connector board 40 and a support block 50. Since only about 2 inches of the end of the connector board 40 is nailed to the support block 50, the nail plate 20 greatly strengthens this board and improves the impact resistance when hit by a forklift or any other object.

The other illustrated board in the base layer is an end deck board 42. In the cargo layer, the illustrated boards include a connector board 60, an end deck board 62, and an intermediate deck board 64. Nails 70 are used to secure the respective boards to the support block 50.

Figure 3:
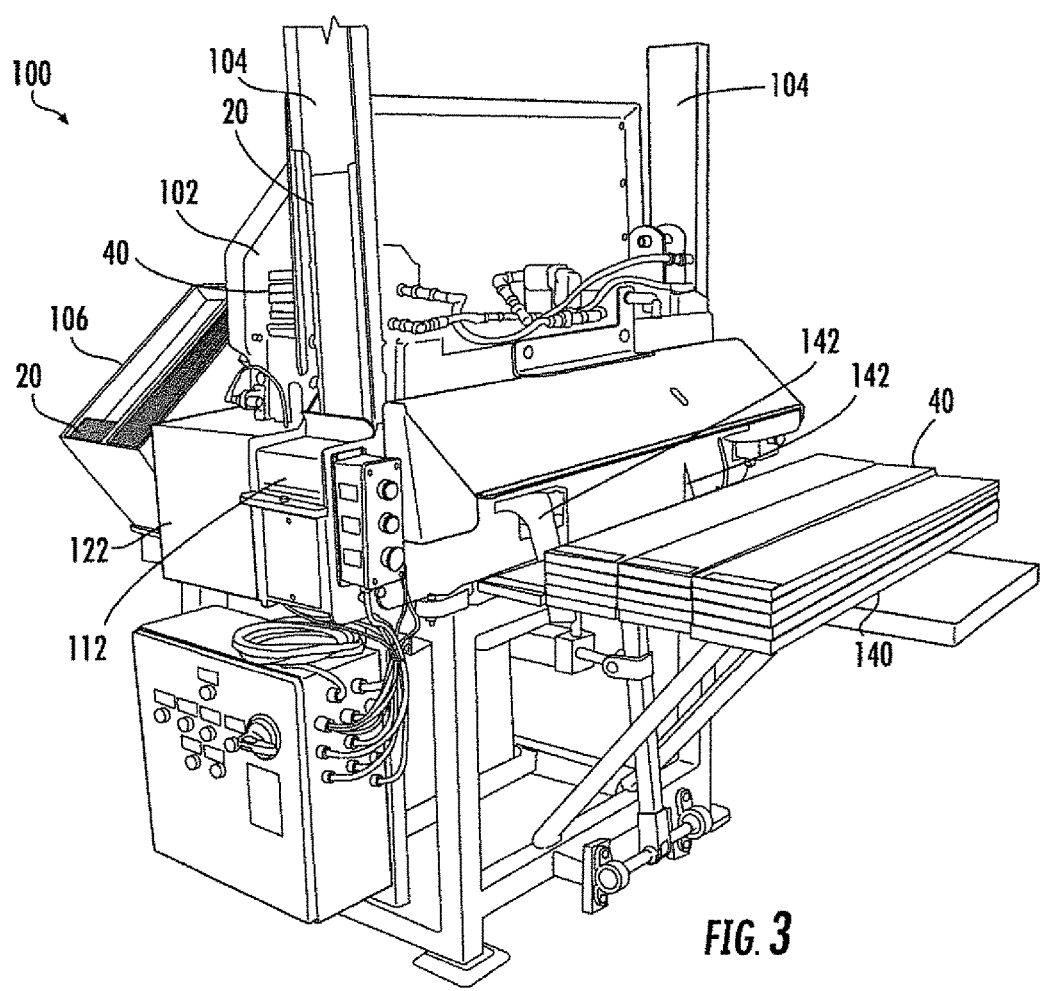
FIG. 3 is a front perspective view of a nail plater apparatus in accordance with the present invention.
Figure 4:
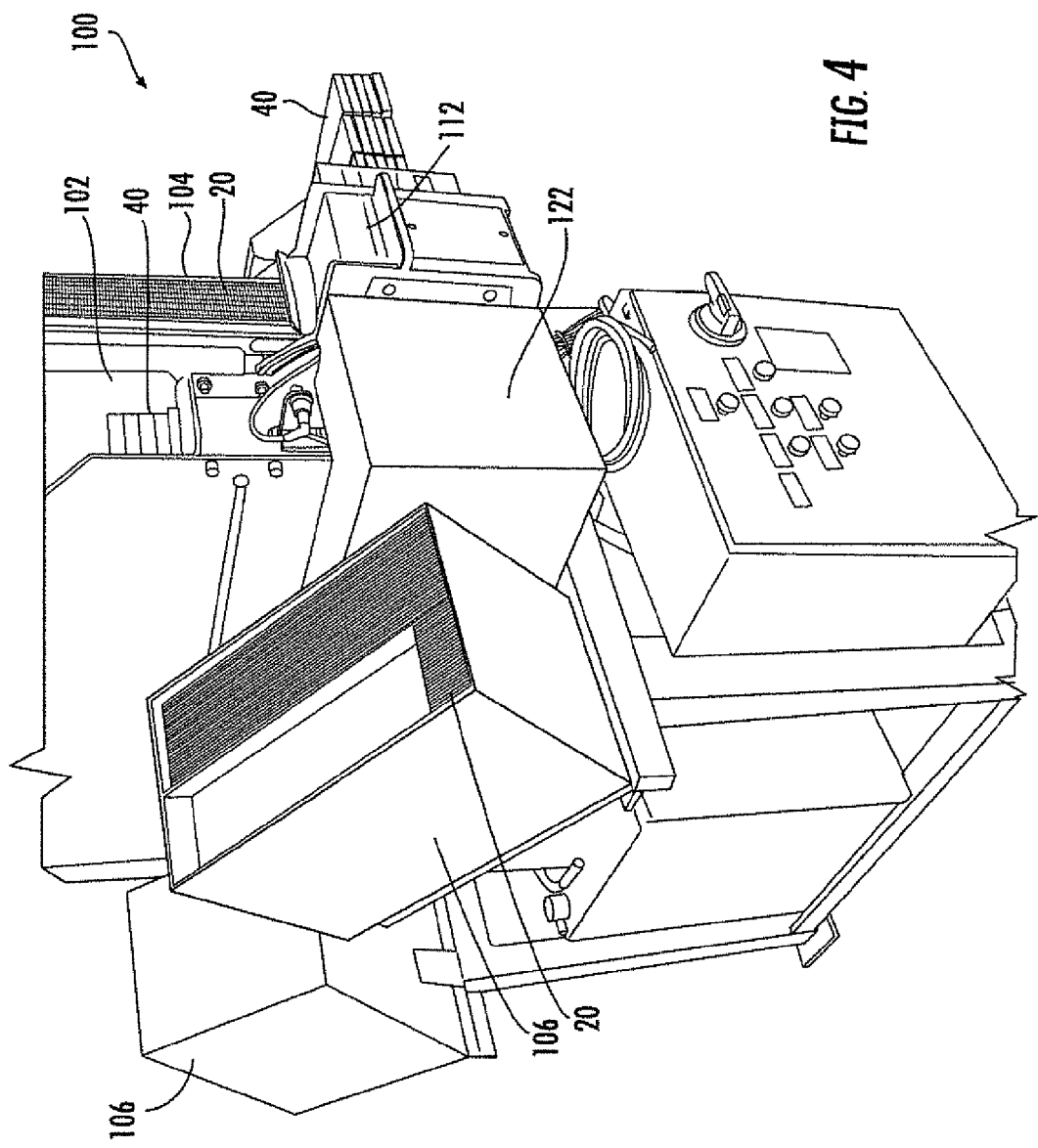
FIG. 4 is a rear perspective view of the nail plater apparatus shown in FIG. 3.
Figure 5:
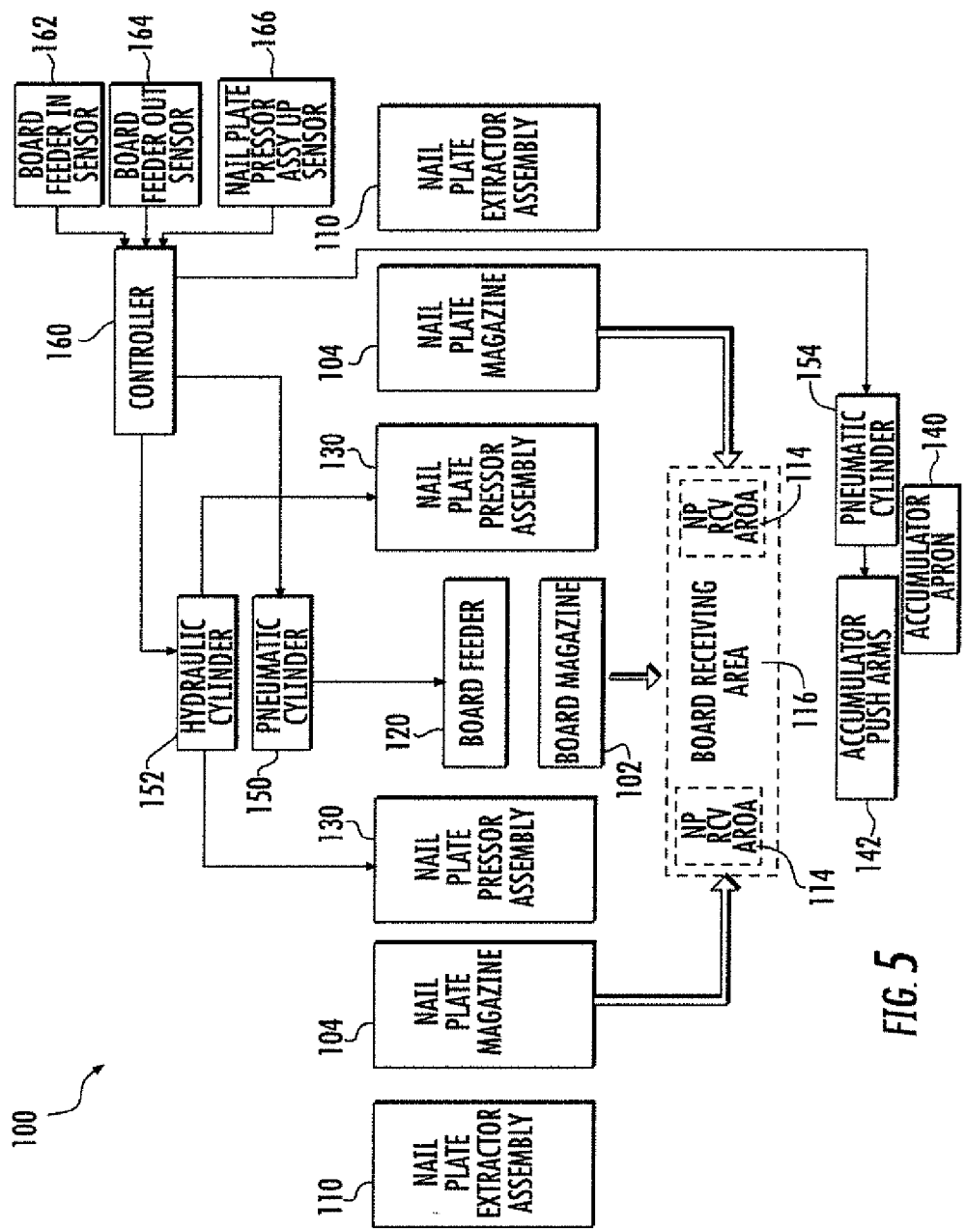
FIG. 5 is a block diagram of the nail plater apparatus shown in FIG. 3.

The nail plates 20 are pressed onto the ends of the connector boards 40 using a nail plater apparatus 100, as illustrated in FIGS. 3 and 4. A block diagram of the illustrated nail plater apparatus 100 will also be referenced in FIG. 5. The nail plater apparatus 100 advantageously supports high speed production runs providing plated boards. For discussion purposes, the connector board 40 will be referred to as a board or as a plated board.

High speed production runs by the nail plate apparatus 100 are supported by simultaneously pressing the nail plates 20 onto the ends of each received board 40. As a board 40 is received, the nail plates 20 are simultaneously positioned over the ends of the board. After the nail plates 20 are pressed onto the ends of the received board 40, the plated board is then removed by the next board received board.

No mechanical mechanism is needed to remove the plated board 40 since the next board coming in pushes the plated board out. The speed and accuracy of the nail plater apparatus 100 advantageously allows a board 40 to be plated about every 1.7 seconds, which is about 2100 boards per hour.

The nail plater apparatus 100 includes a board magazine 102 configured to hold boards 40 stacked in a vertical direction, and spaced apart nail plate magazines 102. Each nail plate magazine 104 is configured to hold nail plates 20 stacked in a vertical direction.

To assist the operator in loading the nail plates 20 in the respective nail plate magazines 102, angled or tilted nail plate holders 106 are adjacent each respective nail plate magazine 102. The operator uses a magnetic device to move a group of nail plates 20 in each nail plate holder 106 to an adjacent nail plate magazine 102.

Spaced apart nail plate extractor assemblies 110 are located under their respective nail plate extractor guards 112. Each nail plate extractor assembly 110 is associated with a respective nail plate magazine 102 and is configured to position a nail plate 20 therefrom to a respective nail plate pressing area 114.

A board feeder 120 is located under a board feeder guard 122, and is configured to position a board 40 from the board magazine 102 to a board receiving area 116. The ends of the board 40 are aligned with the nail plates 20 positioned in the respective nail plate pressing areas 114.

Spaced apart nail plate presser assemblies 130 overlie the ends of the board receiving area 116 and are aligned with the respective nail plate pressing areas 114. The nail plate presser assemblies 130 are configured to press the nail plates 20 into the ends of the board 40.

After a board 40 has the nail plates 20 pressed therein, the plated board is then pushed by the next received board to an accumulator apron 140. The plated boards 40 may be stacked in groups of 5, for example. Once the stack receives the fifth plated board, spaced apart accumulator push arms 142 push the stack of plated boards 40 further out on the accumulator apron 140 so as to allow room for another stack of plated boards to form.

As will be discussed in greater detail below, the board feeder 120 and the nail plate extractor assemblies 110 are linked together. When the board feeder 120 is in the out-position to allow a board 40 to drop into position from the board magazine 102, the nail plate extractor assemblies 110 are also in the out-position to allow nail plates 20 to drop into position from the nail plate magazines 104. When the board feeder 120 is in the in-position this causes the board 40 to be moved to the board receiving area 116, and the nail plate extractor assemblies 110 are also moved to the in-position causing the nail plates 20 to be moved to the nail plate pressing areas 114.

The nail plate presser assemblies 130 then press the nail plates 20 into the ends of the board 40 with the board feeder 120 and the nail plate extractor assemblies 110 being in the in-position. After the nail plates 20 have been pressed into the ends of the board 40, the board feeder 120 returns to the out-position to allow a next board to drop into position from the board magazine 102 while the nail plate extractor assemblies 110 also return to the out-position to allow the next nail plates 20 to drop into position. This cycle continuously repeats itself.

The board feeder 120 is powered by a pneumatic cylinder 150. Since the nail plate extractor assemblies 110 are linked to the board feeder 120, the nail plate extractor assemblies 110 move when the board feeder moves. The nail plate presser assemblies 130 are powered by a hydraulic pump 152.

A controller 160 is coupled to the pneumatic cylinder 150 and to the hydraulic pump 152 for control thereof. The controller 160 receives input from a board feeder in-position sensor 162, a board feeder out-position sensor 164 and a nail plate presser assembly up sensor 166. The respective sensors 162, 164, 166 may be proximity sensors, for example.

The accumulator push arms 142 are also moved by a pneumatic cylinder 156. The pneumatic cylinder 156 is coupled to the controller 160.

Figure 6:
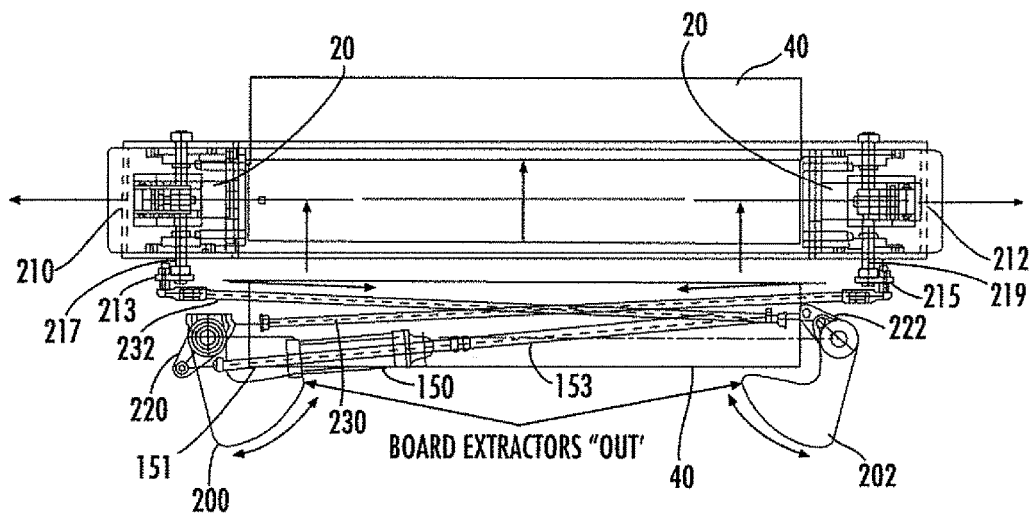
FIG. 6 is a top schematic view of the board feeder and the nail plate extractor assemblies shown in FIG. 3 in the out-position.
Figure 7:
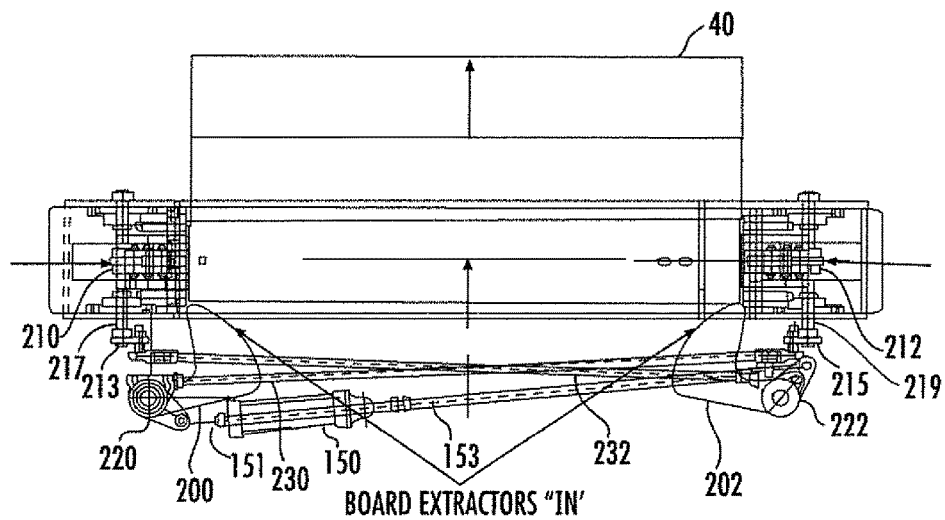
FIG. 7 is a top schematic view of the board feeder and the nail plate extractor assemblies shown in FIG. 3 in the in-position.
Figure 8:
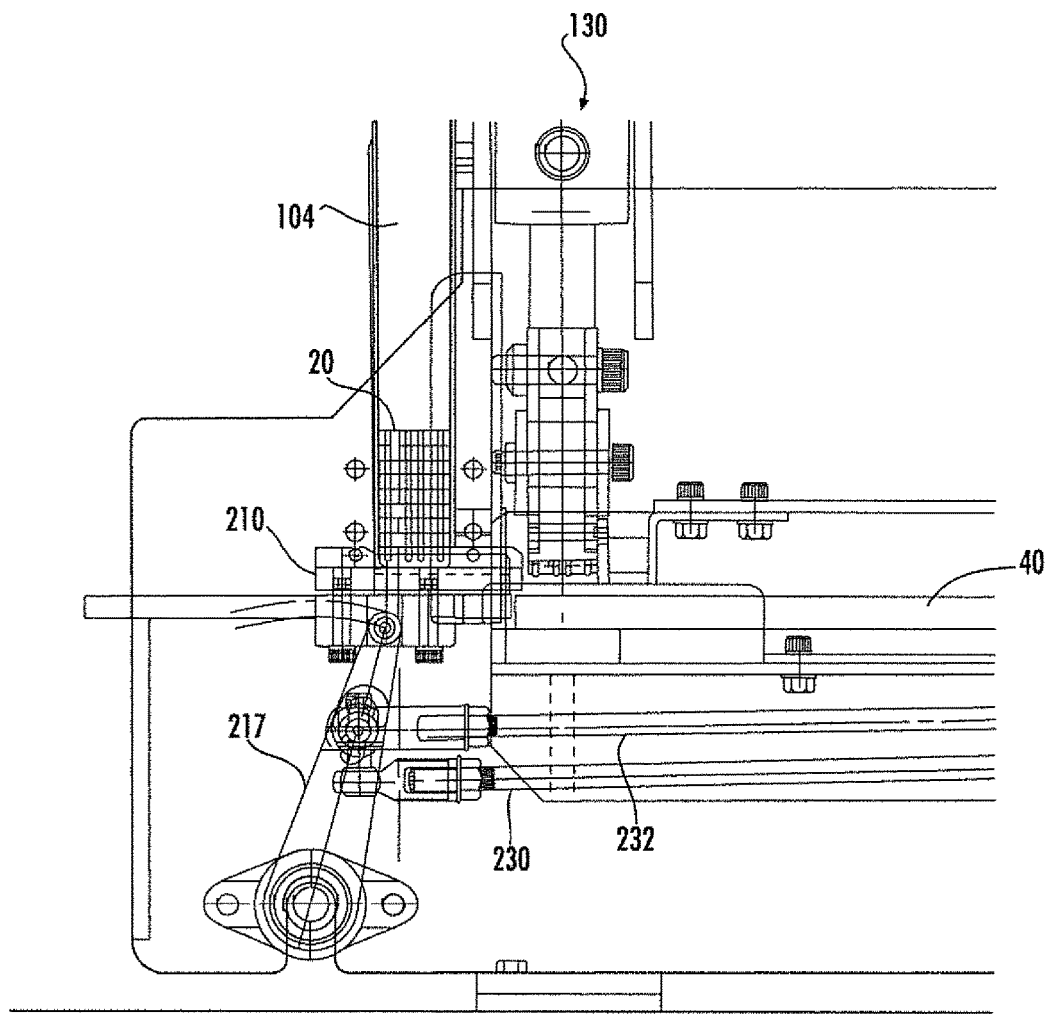
FIG. 8 is a side schematic view of one of the nail plate extractor assemblies shown in FIG. 6 in the in-position.

Referring now to FIGS. 6-8, the board feeder 120 and the nail plate extractor assemblies 110 will be discussed in greater detail. As noted above, the board feeder 120 and the nail plate extractor assemblies 110 are linked together so that the board 40 is positioned in the board receiving area 116 simultaneously when the nail plates 20 are positioned in the respective nail plate pressing areas 114.

The board feeder 120 includes a pair of spaced apart first and second board extractors 200, 202. The pair of spaced apart nail plate extractor assemblies 110 include a pair of spaced apart first and second nail plate extractors 210, 212.

Spaced apart first and second cams 220, 222 are each configured to rotate between an in-position and an out-position, with the first board extractor 200 coupled to the first cam and the second board extractor 202 coupled to the second cam 222.

A first linkage 230 is coupled between the first cam 220 and the second nail plate extractor 212. A second linkage 232 is coupled between the second cam 222 and the first nail plate extractor 210. Movement of the first and second cams 220, 222 is by way of a push-pull pneumatic cylinder 150. One end of the pneumatic cylinder 150 is coupled to the first cam 220 by linkage 151 and the other end of the pneumatic cylinder is coupled to the second cam 222 by linkage 153.

When the first and second cams 220, 222 are rotated to the out-position, as shown in FIG. 6, a board 40 is dropped from the board magazine 102 to a board staging area adjacent the spaced apart first and second board extractors 200, 202. Nail plates 20 are dropped from the nail plate magazines 104 to nail plate staging areas adjacent the first and second nail plate extractors 210, 212.

When the first and second cams 220, 222 are rotated to the in-position, as shown in FIG. 7, the board 40 is positioned from the board staging area to the board receiving area 116 by the first and second board extractors 200, 202. The nail plates 20 are simultaneously positioned from the nail plate staging areas to the nail plate receiving areas 114 by the first and second nail plate extractors 210, 212.

When the first and second cams 220, 222 are rotated back to the out-position, a next board 40 is dropped from the board magazine 102 to the board staging area and next nail plates 20 are dropped from the nail plate magazines 104 to the nail plate staging areas.

When the first and second cams 220, 222 are rotated back to the in-position, the next board 40 is used to push the plated board from the board receiving area 116 to the adjacent accumulator apron 140. In other words, no mechanical mechanism is needed to remove the plated board 40 since the next board coming in pushes the plated board out. The speed and accuracy of the nail plater apparatus 100 advantageously allows a board 40 to be plated about every 1.7 seconds, which is about 2100 boards per hour.

The pair of spaced apart nail plate extractor assemblies 110 further include a pair of spaced apart first and second arms 213, 215. The first arm 213 is coupled to the second linkage 232 and the second arm 215 is coupled to the first linkage 230. A first arm shaft 217 is coupled between the first arm 217 and the first nail plate extractor 210. Similarly, a second arm shaft 219 is coupled between the second arm 215 and the second nail plate extractor 212. The first and second arms 213, 215 and the corresponding first and second arm shafts 217, 219 insure that the first and second nail plated 210, 212 move in synch with the first and second board extractors 200, 202.

Figure 9:
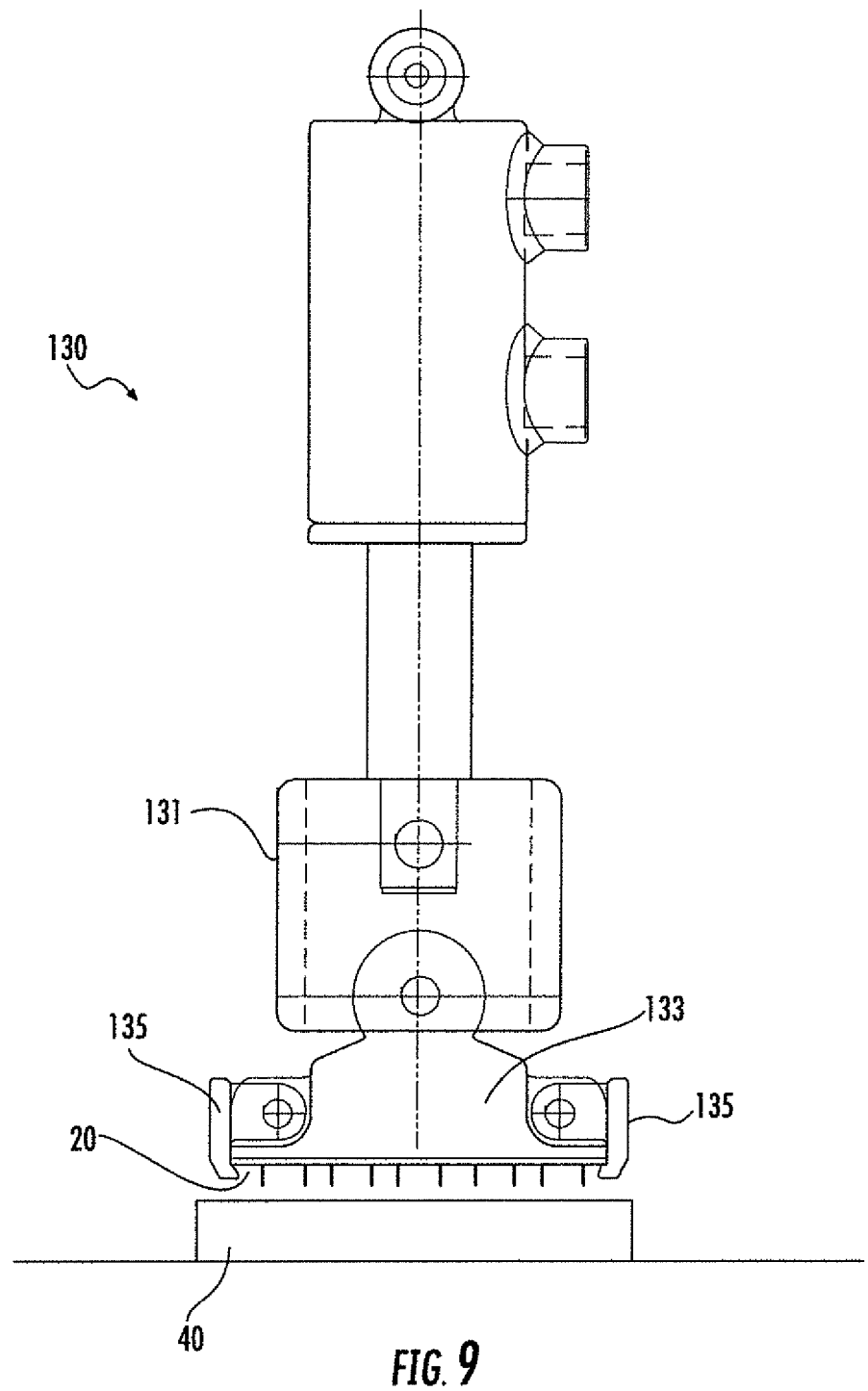
FIG. 9 is a side schematic view of one of the nail plate presser assemblies shown in FIG. 3 in the up-position holding a nail plate above an end of a board.
Figure 10:
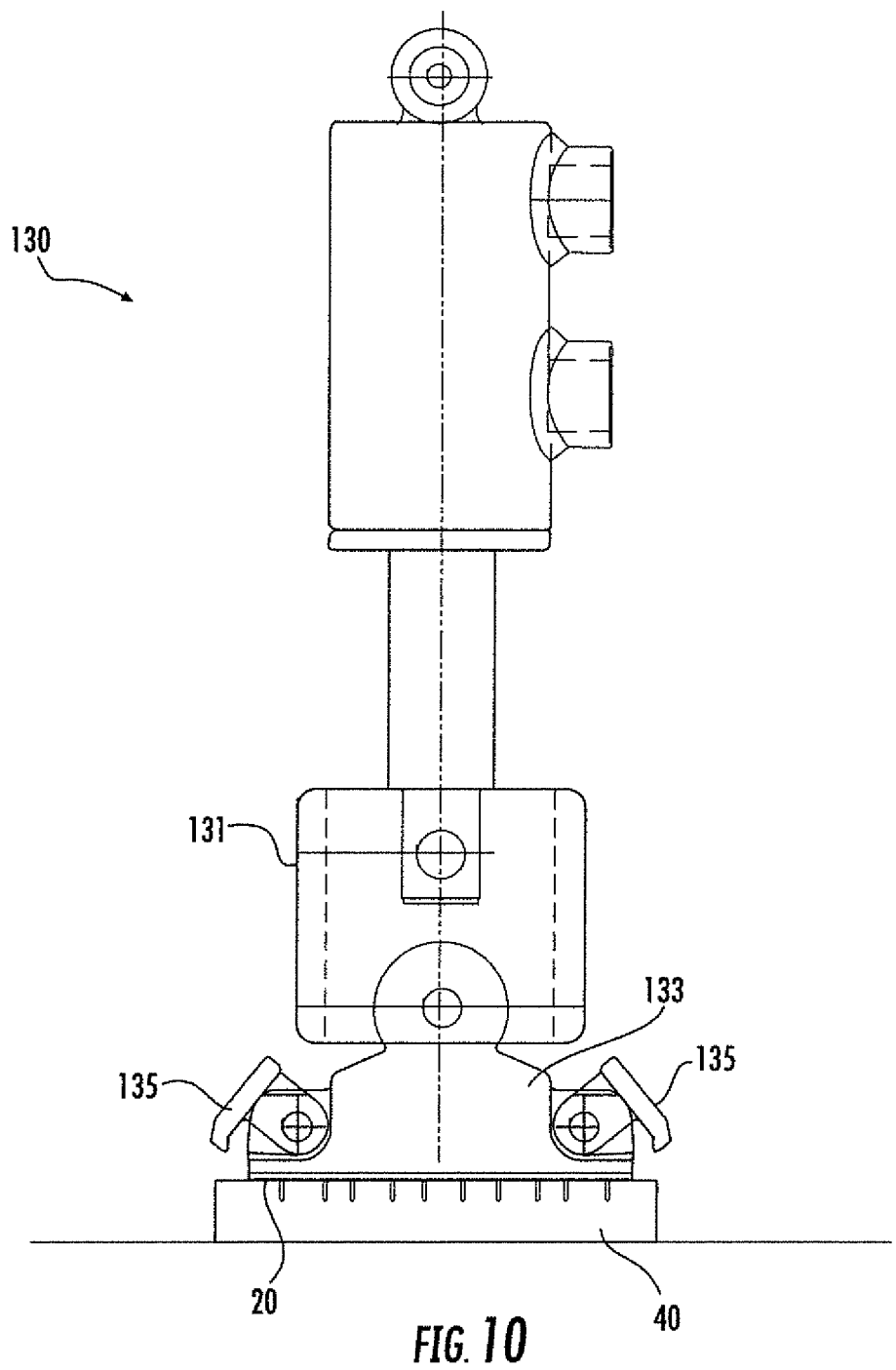
FIG. 10 is a side schematic view of the nail plate presser assembly shown in FIG. 9 in the down-position pressing the nail plate into the end of the board.
Figure 11:
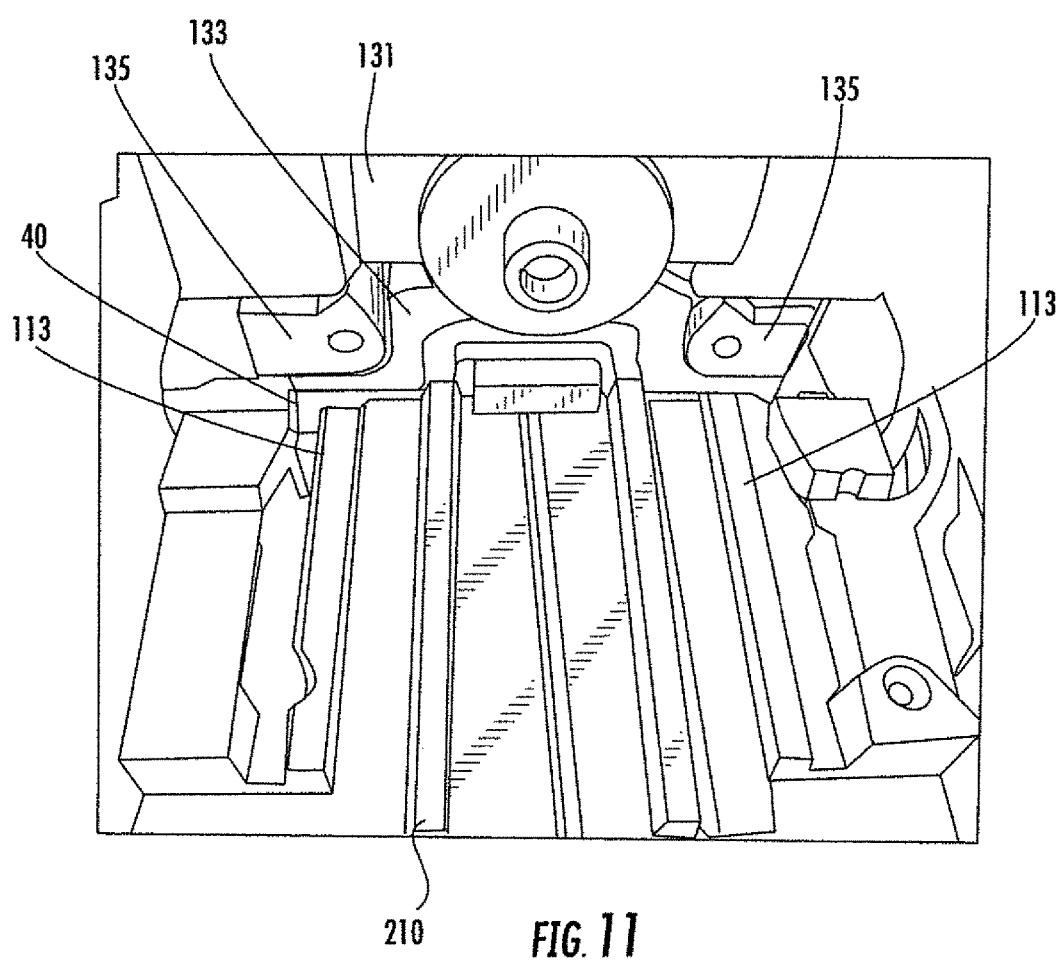
FIG. 11 is a perspective view of one of the nail plate extractors (in the in-position) and one of the nail plate presser assemblies (in the down-position) shown in FIG. 3 without the nail plate magazine in place.

Referring now to FIGS. 9-11, each nail plate presser assembly 130 includes a hydraulic ram 131, a press foot 133 coupled to the hydraulic ram, and a pair of spaced apart nail plate retainer jaws 135 pivotly coupled to the press foot. The nail plate retainer jaws 135 are configured to hold the nail plate 20 when positioned in the nail plate receiving area 114. The pair of nail plate retainer jaws 135 pivotly move to release the nail plate 20 when the hydraulic ram 131 causes the nail plate to be pressed into the end of the board 40.

FIG. 11 provides a perspective view of one of the nail plate extractors 210 (in the in-position) and one of the nail plate presser assemblies 130 (in the down-position) without the nail plate magazine in place. When the nail plate extractor 210 is in the retracted or out-positon, a nail plate 20 is dropped from the nail plate magazine 104 onto a pair of spaced apart rails 113. As the nail plate extractor 210 is moved to the in-position, the nail plate is moved to the nail plate receiving area 114 under the press foot 133.

Figure 12:
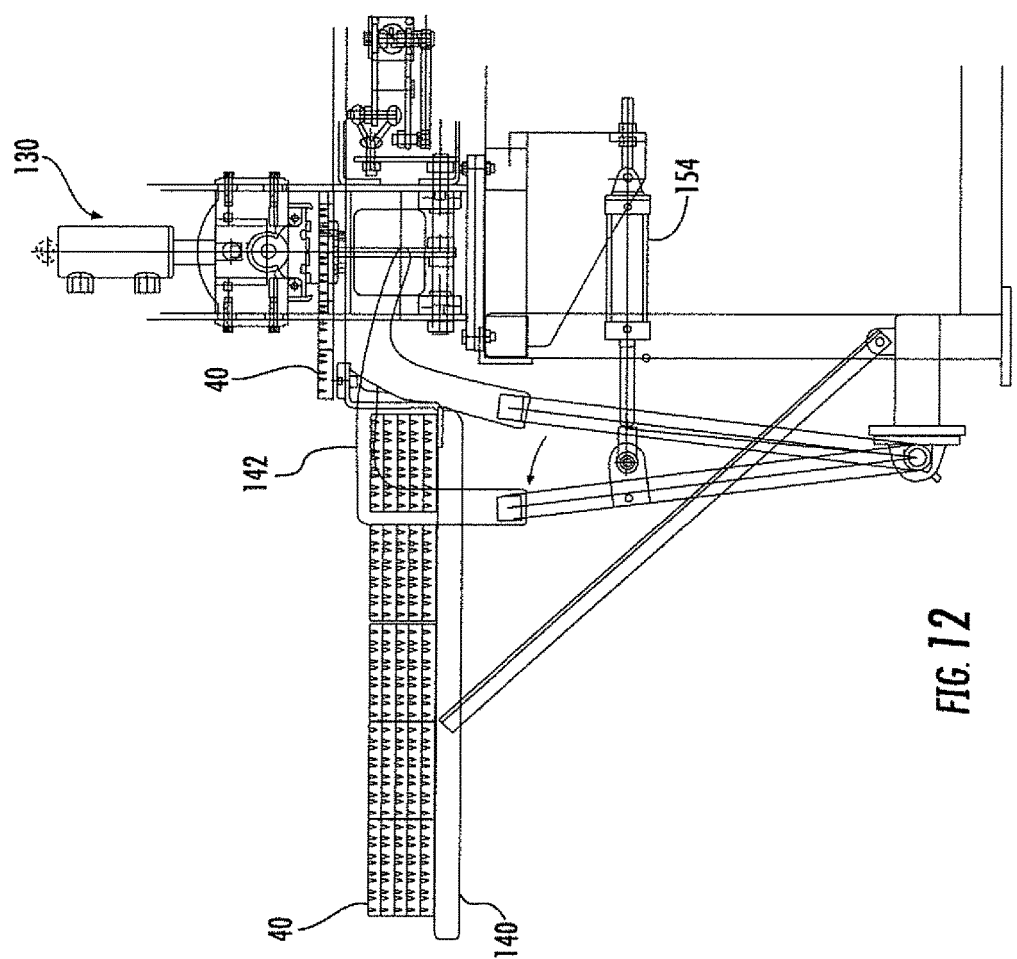
FIG. 12 is a partial side schematic view of the nail plate apparatus shown in FIG. 3.
Figure 13:
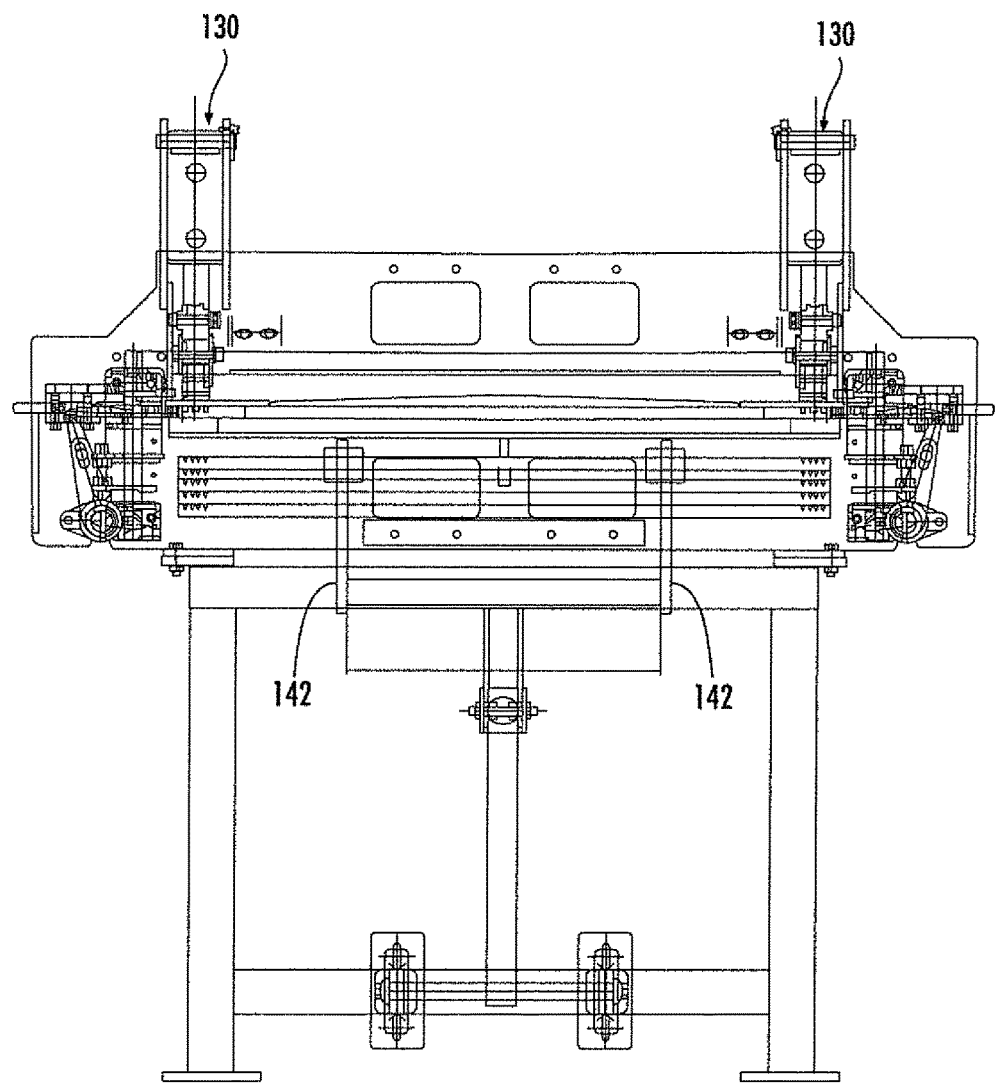
FIG. 13 is a partial front schematic view of the nail plate apparatus shown in FIG. 3.

Referring now to FIGS. 12-13, an accumulator apron 140 is positioned to receive the boards 40 after the nail plates 20 have been pressed into the ends thereof by the nail plate presser assemblies 130. A pair of spaced apart accumulator push arms 142 adjacent the accumulator apron 140 is configured to push the boards 40 after a predetermined number of boards have been stacked on the accumulator apron. The accumulator push arms 142 are powered by a pneumatic cylinder 154.

Figure 14:
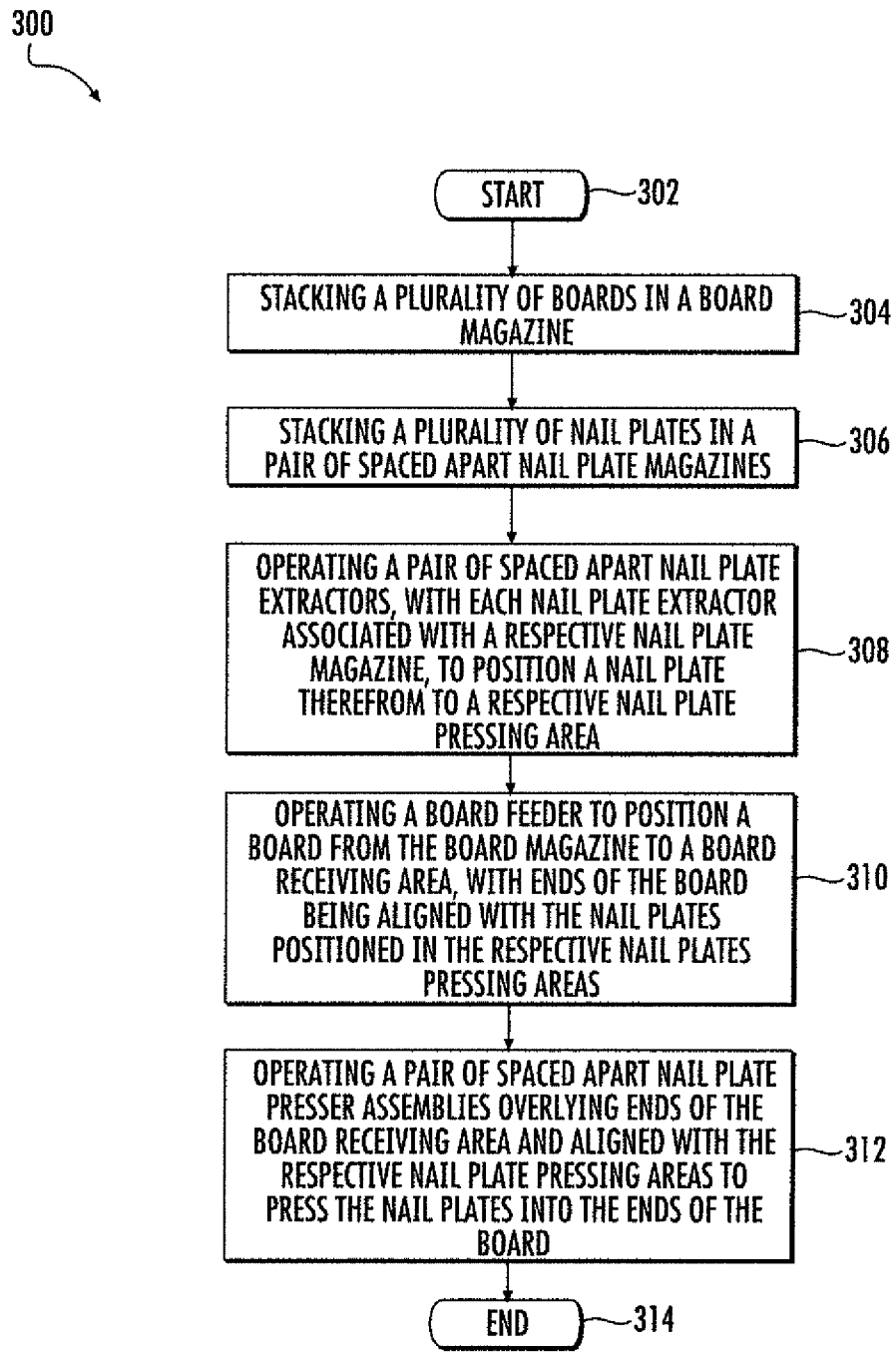
FIG. 14 is a flowchart illustrating a method for pressing nail plates into ends of a board using the nail plate apparatus shown in FIG. 3.

Referring now to the flowchart 300 shown in FIG. 14, another aspect is directed to a method for pressing nail plates 20 into ends of a board 40 using a nail plate apparatus 100 as described above. From the start (Block 302), the method comprises stacking a plurality of boards 40 in a board magazine 104 at Block 304, and stacking a plurality of nail plates 20 in a pair of spaced apart nail plate magazines 104 at Block 306.

A pair of spaced apart nail plate extractor assemblies 110 is operated at Block 308, with each nail plate extractor assembly associated with a respective nail plate magazine 104, to position a nail plate 20 therefrom to a respective nail plate pressing area 114. A board feeder 120 is operated at Block 310 to position a board 40 from the board magazine 102 to a board receiving area 116, with ends of the board being aligned with the nail plates positioned in the respective nail plate pressing areas 114. A pair of spaced apart nail plate presser assemblies 130 overlies ends of the board receiving area 116 and aligned with the respective nail plate pressing areas 114 and is operated at Block 312 to press the nail plates 20 into the ends of the board 40. The method ends at Block 314.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included as readily appreciated by those skilled in the art.

That which is claimed:

1. A nail plater apparatus comprising:
    a board magazine configured to hold a plurality of stacked boards;
    a pair of spaced apart nail plate magazines, with each nail plate magazine configured to hold a plurality of stacked nail plates;
    a pair of spaced apart nail plate extractor assemblies, with each nail plate extractor assembly associated with a respective nail plate magazine and configured to position a nail plate therefrom to a respective nail plate pressing area;
    a board feeder configured to position a board from said board magazine to a board receiving area, with ends of the board being aligned with the nail plates positioned in the respective nail plate pressing areas; and
    a pair of spaced apart nail plate presser assemblies overlying ends of the board receiving area and aligned with the respective nail plate pressing areas and configured to press the nail plates into the ends of the board.

2. The nail plater apparatus according to claim 1, wherein said board feeder and said pair of spaced apart nail plate extractor assemblies are linked together so that the board is positioned in the board receiving area simultaneously when the nail plates are positioned in the respective nail plate pressing areas.

3. The nail plater apparatus according to claim 1, wherein said board feeder comprises a pair of spaced apart first and second board extractors, and wherein said pair of spaced apart nail plate extractor assemblies comprises a pair of spaced apart first and second nail plate extractors.

4. The nail plater apparatus according to claim 3, further comprising:
    a pair of spaced apart first and second cams each configured to rotate between an in-position and an out-position, with said first board extractor coupled to said first cam and said second board extractor coupled to said second cam;
    a first linkage coupled between said first cam and said second nail plate extractor, and a second linkage coupled between said second cam and said first nail plate extractor;
    when said first and second cams are rotated to the out-position a board is dropped from said board magazine to a board staging area adjacent said pair of spaced apart first and second board extractors, and nail plates are dropped from said pair of a nail plate magazines to a nail plate staging area adjacent said pair of spaced apart first and second nail plate extractors; and
    when said first and second cams are rotated to the in-position the board is positioned from the board staging area to the board receiving area by said pair of spaced apart first and second board extractors, and the nail plates are positioned from the nail plate staging areas to the nail plate receiving areas by said pair of spaced apart first and second nail plate extractors.

5. The nail plater apparatus according to claim 4, wherein the board in the board staging area is used by said first and second board extractors to push a board out of the board receiving area after the nail plates have been pressed into the ends thereof by said nail plate presser assemblies.

6. The nail plater apparatus according to claim 1, wherein each nail plate presser assembly comprises:
    a hydraulic ram;
    a press foot coupled to said hydraulic ram; and
    a pair of spaced apart nail plate retainer jaws pivotly coupled to said press foot and configured to hold the nail plate when positioned in the nail plate receiving area.

7. The nail plater apparatus according to claim 6, wherein said pair of nail plate retainer jaws pivotly move to release the nail plate when said hydraulic ram causes the nail plate to be pressed into the end of the board.

8. The nail plater apparatus according to claim 1, further comprising:
    an accumulator apron to receive the boards after the nail plates have been pressed into the ends thereof by said nail plate presser assemblies; and
    a pair of spaced apart accumulator push arms adjacent said accumulator apron and configured to push the boards after a predetermined number of boards have been stacked on said accumulator apron.

9. The nail plater apparatus according to claim 1, further comprising a hydraulic cylinder coupled to said pair of nail plate presser assemblies for control thereof.

10. The nail plater apparatus according to claim 1, further comprising a pneumatic cylinder coupled to said board feeder for control thereof pair.

11. A nail plater apparatus comprising:
    a board magazine configured to hold a
    plurality of stacked boards;
    a pair of spaced apart nail plate magazines, with each nail plate magazine configured to hold a plurality of stacked nail plates;
    a pair of spaced apart nail plate extractor assemblies, with each nail plate extractor assembly associated with a respective nail plate magazine and configured to position a nail plate therefrom to a respective nail plate pressing area;
    a board feeder configured to position a board from said board magazine to a board receiving area, with ends of the board being aligned with the nail plates positioned in the respective nail plate pressing areas;
    a pair of spaced apart nail plate presser assemblies overlying ends of the board receiving area and aligned with the respective nail plate pressing areas and configured to press the nail plates into the ends of the board;

said board feeder and said pair of spaced apart nail plate extractor assemblies being linked together so that the board is positioned in the board receiving area simultaneously when the nail plates are positioned in the respective nail plate pressing areas;

an accumulator apron to receive the boards after the nail plates have been pressed into the ends thereof by said nail plate presser assemblies; and at least one accumulator push arm adjacent said accumulator apron configured to push the boards after a predetermined number of boards have been stacked on said accumulator apron.

12. The nail plater apparatus according to claim 11, wherein said board feeder comprises a pair of spaced apart first and second board extractors, and wherein said pair of spaced apart nail plate extractor assemblies comprises a pair of spaced apart first and second nail plate extractors.

13. The nail plater apparatus according to claim 12, further comprising:

a pair of spaced apart first and second cams each configured to rotate between an in-position and an out-position, with said first board extractor coupled to said first cam and said second board extractor coupled to said second cam;

a first linkage coupled between said first cam and said second nail plate extractor, and a second linkage coupled between said second cam and said first nail plate extractor;

when said first and second cams are rotated to the out-position a board is dropped from said board magazine to a board staging area adjacent said pair of spaced apart first and second board extractors, and nail plates are dropped from said pair of a nail plate magazines to a nail plate staging area adjacent said pair of spaced apart first and second nail plate extractors; and when said first and second cams are rotated to the in-position the board is positioned from the board staging area to the board receiving area by said pair of spaced apart first and second board extractors, and the nail plates are positioned from the nail plate staging areas to the nail plate receiving areas by said pair of spaced apart first and second nail plate extractors.

14. The nail plater apparatus according to claim 13, wherein the board in the board staging area is used by said first and second board extractors to push a board out of the board receiving area after the nail plates have been pressed into the ends thereof by said nail plate presser assemblies.

15. The nail plater apparatus according to claim 11, wherein each nail plate presser assembly comprises:

a hydraulic ram;

a press foot coupled to said hydraulic ram; and a pair of spaced apart nail plate retainer jaws pivotly coupled to said press foot and configured to hold the nail plate when positioned in the nail plate receiving area.

16. The nail plater apparatus according to claim 15, wherein said pair of nail plate retainer jaws pivotly move to release the nail plate when said hydraulic ram causes the nail plate to be pressed into the end of the board.

17. The nail plater apparatus according to claim 11, further comprising:

a hydraulic cylinder coupled to said pair of nail plate presser assemblies for control thereof; and a pneumatic cylinder coupled to said board feeder for control thereof pair.

18. A method for pressing nail plates into ends of a board comprising:

stacking a plurality of boards in a board magazine;

stacking a plurality of nail plates in a pair of spaced apart nail plate magazines;

operating a pair of spaced apart nail plate extractor assemblies, with each nail plate extractor assembly associated with a respective nail plate magazine, to position a nail plate therefrom to a respective nail plate pressing area;

operating a board feeder to position a board from the board magazine to a board receiving area, with ends of the board being aligned with the nail plates positioned in the respective nail plate pressing areas; and operating a pair of spaced apart nail plate presser assemblies overlying ends of the board receiving area and aligned with the respective nail plate pressing areas to press the nail plates into the ends of the board.

19. The method according to claim 18, wherein the board feeder and the pair of spaced apart nail plate extractor assemblies are linked together so that the board is positioned in the board receiving area simultaneously when the nail plates are positioned in the respective nail plate pressing areas.

20. The method according to claim 18, wherein the board feeder comprises a pair of spaced apart first and second board extractors, and wherein the pair of spaced apart nail plate extractor assemblies comprises a pair of spaced apart first and second nail plate extractors.

21. The method according to claim 20, wherein a nail plate apparatus further comprises a pair of spaced apart first and second cams each configured to rotate between an in-position and an out-position, with the first board extractor coupled to the first cam and the second board extractor coupled to the second cam; and a first linkage coupled between the first cam and the second nail plate extractor, and a second linkage coupled between the second cam and the first nail plate extractor, the method further comprising:

when the first and second cams are rotated to the out-position a board is dropped from the board magazine to a board staging area adjacent the pair of spaced apart first and second board extractors, and nail plates are dropped from the pair of a nail plate magazines to a nail plate staging area adjacent the pair of spaced apart first and second nail plate extractors; and when the first and second cams are rotated to the in-position the board is positioned from the board staging area to the board receiving area by the pair of spaced apart first and second board extractors, and the nail plates are positioned from the nail plate staging areas to the nail plate receiving areas by the pair of spaced apart first and second nail plate extractors.

22. The method according to claim 21, wherein the board in the board staging area is used by the first and second board extractors to push a board out of the board receiving area after the nail plates have been pressed into the ends thereof by said nail plate presser assemblies.

23. The method according to claim 18, wherein each nail plate presser assembly comprises a hydraulic ram, a press foot coupled to said hydraulic ram, and a pair of spaced apart nail plate retainer jaws pivotly coupled to the press foot and configured to hold the nail plate when positioned in the nail plate receiving area, the method further comprising:

pivotly moving the respective pairs of nail plate retainer jaws to release the nail plates when the hydraulic rams cause the nail plates to be pressed into the ends of the board.

24. The method according to claim 18, wherein a nail plate apparatus further comprises an accumulator apron to receive the boards after the nail plates have been pressed into the ends thereof by the nail plate presser assemblies, and at least one accumulator push arm adjacent the accumulator apron, the method further comprising:

operating the at least one accumulator push arm to push the boards after a predetermined number of boards have been stacked on the accumulator apron.

\* \* \* \* \*